(12) United States Patent
Schrader et al.

(10) Patent No.: US 11,182,574 B2
(45) Date of Patent: Nov. 23, 2021

(54) EXTENSIBLE MACHINE WORKFLOW AND EVENT REPORTING PROTOCOL

(71) Applicant: Amazon Technologies, Inc., Seattle, WA (US)

(72) Inventors: Karl Eric Schrader, Snohomish, WA (US); Daniel Muething, Seattle, WA (US); Jie Zheng, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 3 days.

(21) Appl. No.: 15/917,347

(22) Filed: Mar. 9, 2018

(65) Prior Publication Data
US 2019/0278961 A1    Sep. 12, 2019

(51) Int. Cl.
| G06K 7/10 | (2006.01) |
| B07C 3/08 | (2006.01) |
| B07C 3/18 | (2006.01) |
| B07C 3/14 | (2006.01) |

(52) U.S. Cl.
CPC ............ *G06K 7/10861* (2013.01); *B07C 3/08* (2013.01); *B07C 3/14* (2013.01); *B07C 3/18* (2013.01)

(58) Field of Classification Search
CPC .................................................. G06K 7/10861
USPC .................................................... 235/462.01
See application file for complete search history.

(56) References Cited

U.S. PATENT DOCUMENTS

| 6,457,642 B1 * | 10/2002 | Good | G06K 7/10 235/462.01 |
| 2005/0128055 A1 * | 6/2005 | Allen | G06K 17/00 340/10.2 |
| 2017/0220976 A1 * | 8/2017 | Schmidt | G06Q 10/083 |

FOREIGN PATENT DOCUMENTS

| DE | 102006051777 A1 | 5/2008 | |
| EP | 1607143 A1 | 12/2005 | |
| WO | 2007048564 A1 | 5/2007 | |
| WO | WO-2007048564 A1 * | 5/2007 | ............... B07C 3/14 |

OTHER PUBLICATIONS

PCT Invitation to Pay Additional Fees and Where Applicatble Protest Fees for Application No. PCT/US2019/019287 dated May 17, 2019.
PCT International Preliminary Report on Patentability for Application No. PCT/US2019/019287 dated Sep. 24, 2020.

* cited by examiner

*Primary Examiner* — Rafferty D Kelly
(74) *Attorney, Agent, or Firm* — Patterson + Sheridan, LLP

(57) ABSTRACT

Embodiments herein describe a system that includes a scanner that captures images of a package. The scanner processes the image to identify a destination for the package. For example, the scanner may transmit bar code data identified in the image to an inventory tracking system which issues commands to an item-sortation machine for routing the package to its destination. The images of the package captured by the scanner may include private information that is not needed or used to determine the destination of the package. To protect private information in the package, the scanner assigns an obfuscated ID to the package which the scanner, inventory tracking system, and item-sortation machine can use to pass messages corresponding to the package. After processing the image to identify the destina- (Continued)

tion (e.g., data encoded in a bar code), the scanner can erase the image.

14 Claims, 10 Drawing Sheets

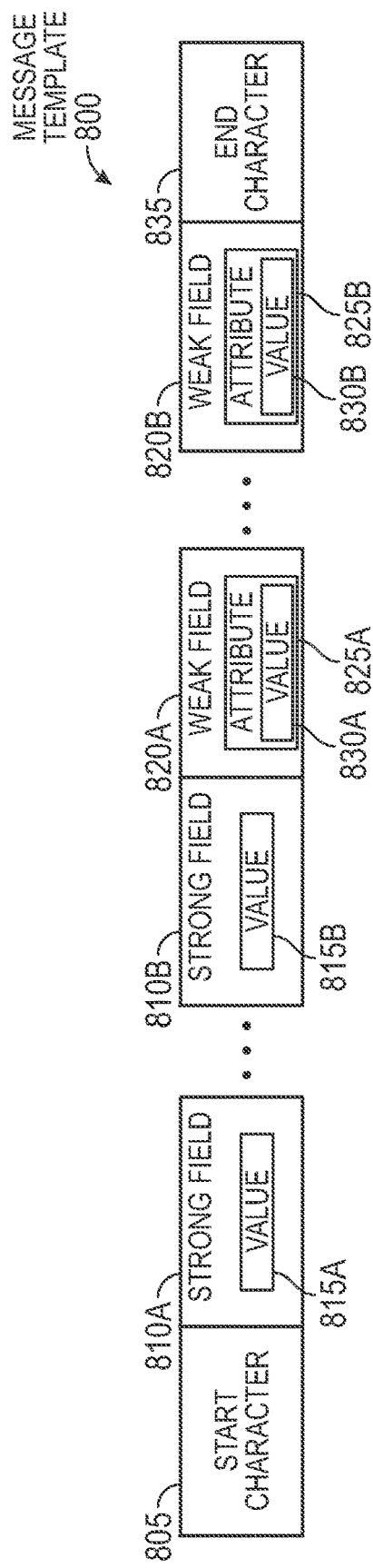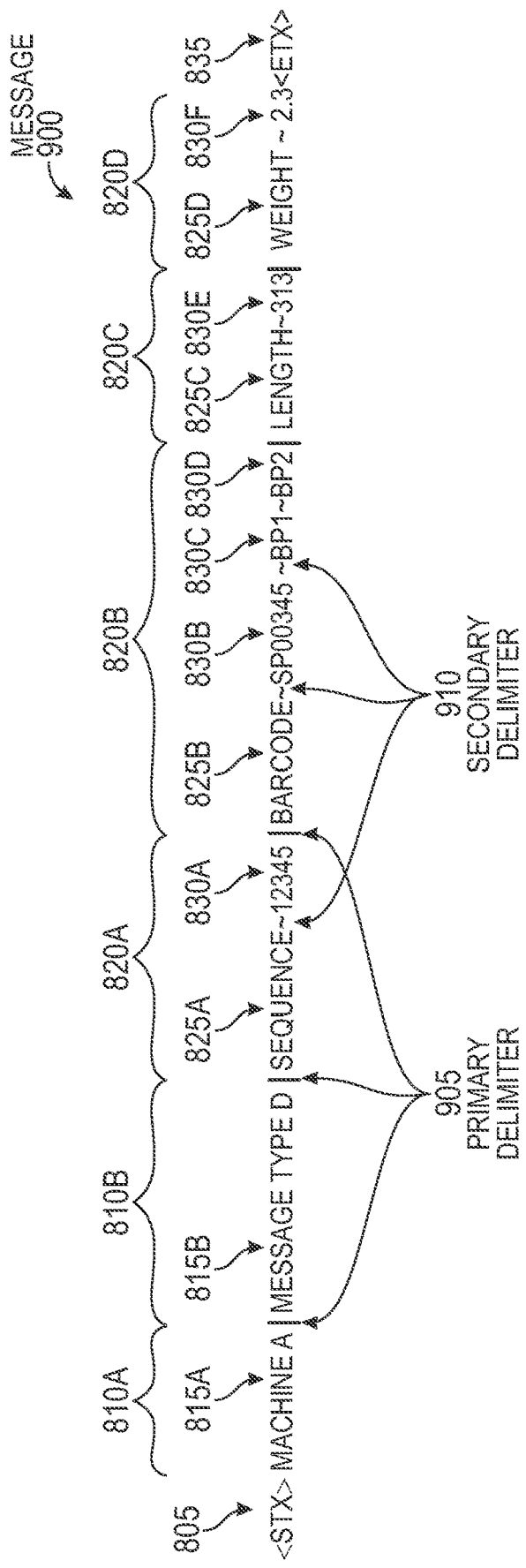
FIG. 8
FIG. 9

EXTENSIBLE MACHINE WORKFLOW AND EVENT REPORTING PROTOCOL

BACKGROUND

Automation relies on machines to perform tasks such as transporting items between locations in a warehouse, assembling or manufacturing products, sorting items, packaging items, removing items from packaging, and the like. Some machines (e.g., item-sortation machines) may capture images of a package when determining how to sort the packages. For example, the item-sortation machine may include an induct tunnel where labels on packages are scanned to determine a destination for the package. The labels may include bar codes which are used by the machine to route the package to a desired destination.

When identifying the bar codes, a scanner in the induct tunnel can capture an image of a shipping label. In addition to the bar codes, the shipping label may include sensitive or private information such as a name of a person to whom the package is addressed, their address, postal code, telephone number, and the like. This sensitive information may be included in the images captured by the scanner. As such, it is desirable to protect the captured images (and the sensitive information therein).

BRIEF DESCRIPTION OF DRAWINGS

Various embodiments in accordance with the present disclosure will be described with reference to the drawings, where like designations denote like elements.

FIG. 8 illustrates a message template for a machine communication protocol, according to various embodiments.

FIG. 9 illustrates a message for a machine communication protocol, according to various embodiments.

DETAILED DESCRIPTION

Figure 1:
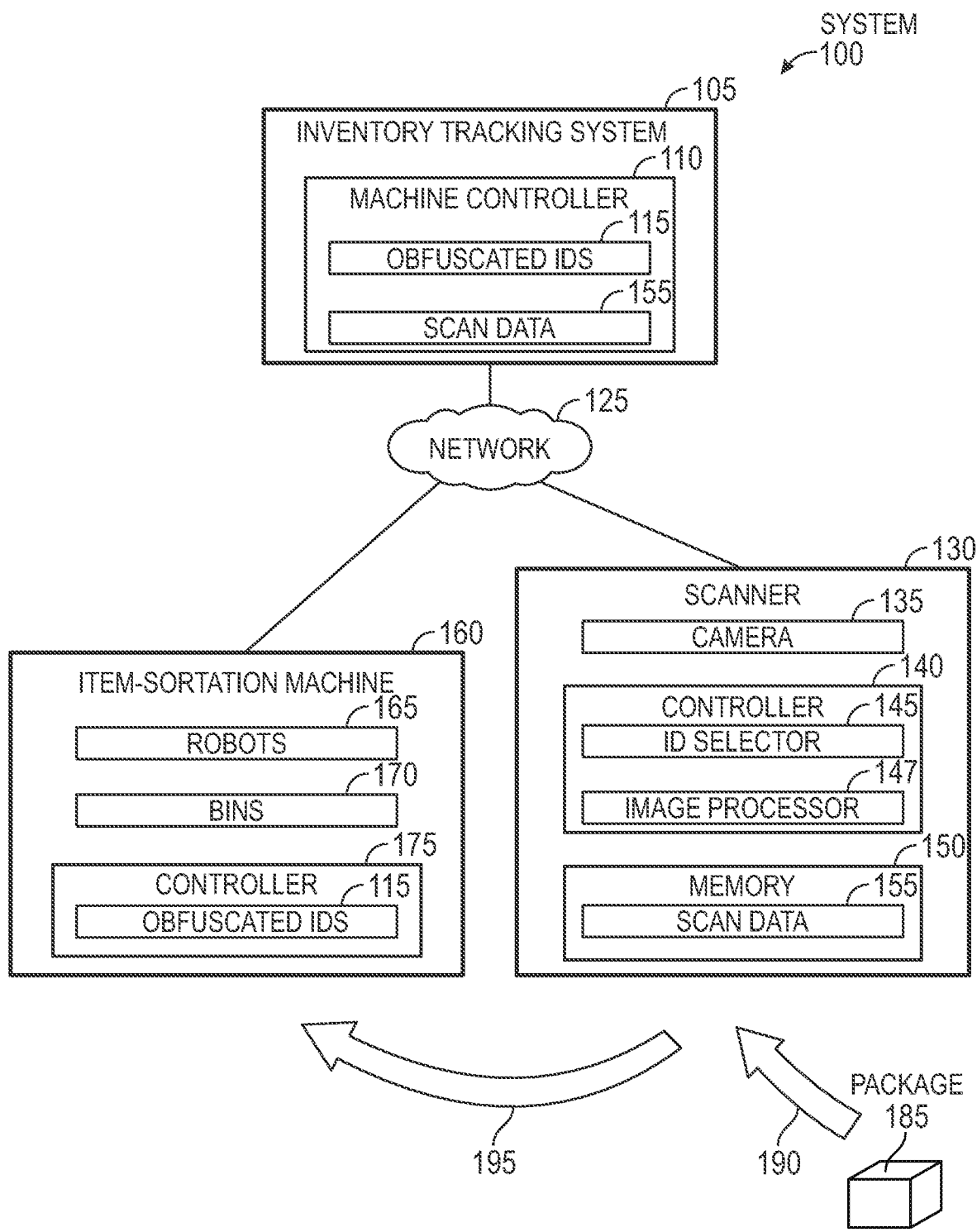
FIG. 1 illustrates a system for issuing commands to an item-sortation machine, according to various embodiments.

Embodiments herein describe a system that includes a scanner that captures images of a package. The scanner processes the image to identify a destination for the package. For example, the scanner may transmit bar code data identified in the image to an inventory tracking system which issues commands to an item-sortation machine for routing the package to its destination. In one embodiment, the scanner is part of an induct tunnel which scans packages as they are fed into the item-sortation machine. Using the information gathered from the scanner, the inventory tracking system can instruct the item-sortation machine to sort the package in a bin or container which corresponds to the destination of the package (e.g., a postal code or warehouse).

As mentioned above, the images of the package captured by the scanner may include private information that is not needed or is not used to determine the destination of the package. After processing the image to identify the destination, the scanner can erase the image. To further protect private information in the package, the scanner assigns an obfuscated ID to the package. For example, the scanner may assign a random or sequential number to each package. The scanner, inventory tracking system, and the item-sortation machine use the obfuscated ID when exchanging messages regarding the package. As such, the private information on the package as well as the contents of the package is protected or hidden since this information is not used to identify the package.

In addition to processing the captured images to identify a destination of the package, the scanner may process the images to identify ancillary data about that package which does not include private or sensitive information such as the dimensions of the package, its color, metrics regarding the quality of the bar code reads, the number of scanners that captured a bar code, and the like. This information, along with the bar code data, can be transmitted to the inventory tracking system using the obfuscated ID. The inventory tracking system can use this ancillary data when issuing commands to the item-sortation machine or log the data which can later be queried to identify maintenance or performance issues in the scanner.

In one embodiment, the scanner, inventory tracking system, and the item-sortation machine transmit information and messages using a format defined by a specialized machine communication protocol. The format can include both strong and weak fields separated by delimiters to provide information and transmit commands between the various systems and devices. For example, the format may require that the first one or two fields in each message are strongly typed, and thus, must include one of a set list of attributes. However, the rest of the message can include any number of weakly typed fields where the attributes (and their order) can vary. When receiving messages from the scanner, the inventory tracking system can parse the messages to identify relevant information and log (or store) the message in repository. The information that is not relevant to (or ignored by) the inventory tracking system may nonetheless be relevant to a user for detecting a status or trends associated with the scanner. For example, a user can search the logged messages to evaluate attributes in the weak fields to determine whether a camera has malfunctioned or to determine the most popular package shape. In this manner, the specialized machine communication protocol provides flexibility for transmitting messages between the various control systems and devices by providing both strongly and weakly typed fields.

FIG. 1 illustrates a system 100 for issuing commands to an item-sortation machine 160, according to various embodiments. The system 100 also includes a scanner 130 and an inventory tracking system 105. The scanner 130 can be mounted on a induct tunnel, over a conveyor belt or rollers, or over a slide such that packages 185 can be scanned and identified. For example, the packages 185 may be postal packages which have attached labels that include bar codes for identifying routing information for the packages 185. However, in other embodiments, the packages 185 can be items contained within a manufacture's wrapping or box which do not include any shipping labels. These packages 185 can include a universal product code (UPC) which can be detected by the scanner 130. In another example, the package 185 can be a crate or container that includes a plurality of individually packaged items.

In one embodiment, the scanner 130 scans the packages 185 (as shown by arrow 190) that enter a warehouse to determine a location where the packages 185 should be stored in the warehouse or where to route the packages for further processing. For example, using a UPC on the package, the package 185 may be routed to a specific shelf, tote, or area in the warehouse for storage. Moreover, by identifying the package 185 using the scanner 130, the system 100 may determine the package 185 contains multiple individually packaged items and route the package 185 to a location where an associate can open the package 185 and separate the items. Once the routing decision is made, the package 185 is moved to the item-sortation machine 160 as shown by arrow 195 to be sorted according to the desired destination.

In another embodiment, the scanner 130 scans the packages 185 as they are leaving a warehouse to be shipped to, for example, a customer or to another warehouse. These packages 185 may include shipping labels which include bar codes that can be detected by the scanner 130 and used to identify the destination of the package 185. Once the package 185 is moved to the item-sortation machine 160 as shown by arrow 195, the machine 160 can sort the package to a tote or container corresponding to the destination of the package 185. For example, each tote may correspond to a different geographic area, postal code, or warehouse. The totes can be retrieved from the item-sortation machine 160 and moved to a loading dock for shipping to their respective destinations.

To scan the packages 185, the scanner 130 includes a camera 135 which captures one or more images of the package 185. The camera 135 can be any sensor that captures images of the package 185 which can be processed to identify routing information useful for sorting, moving, or processing the package 185. Although one camera 135 is shown, the scanner 130 may include any number of cameras which may be disposed at different angles. For example, the routing information of the package 185 (e.g., the UPC, bar code, etc.) may be disposed on different sides of the package 185. For example, the scanner 130 may have cameras 135 that take images of the top, left, right, front, and back of the package 185. Further, the scanner 130 may include a transparent substrate (e.g., glass) so another camera 135 can capture an image of the bottom of the package 185 as it passes over the transparent substrate. Further, because the packages 185 may different shapes and sizes (e.g., cardboard boxes, items wrapped in plastic, envelopes, bubble mailers, crates, etc.), the cameras may be disposed at various angles relative to a surface on which the package 185 moves through the scanner 130, rather than being disposed perpendicular or parallel to that surface. In that way, the cameras 135 may better capture routing information on a slanted surface of the package 185.

The scanner 130 includes a controller 140 which can include hardware, firmware, and software components for scanning the packages 185. The controller 140 includes an ID selector 145 which selects an obfuscated ID for the scanned package 185 and an image processor 147 which evaluates the images captured by the camera 135. In one embodiment, the ID selector 145 assigns a sequential number or random number to the package 185 which can then be used to identify the package when exchanging messages between the scanner 130, the inventory tracking system 105, and the item-sortation machine 160. For example, the ID selector 145 may assign the number X to the package 185, assign the number X+1 to the next scanned package 185, assign the number X+2 to the next scanned package 185, and so forth. Thus, the ID assigned to the package 185 is obfuscated or independent from any information on the package 185. For example, the package may contain a high-value item (e.g., jewelry, an electronic device, or confidential material). If the UPC or other routing information was used to track the package 185, then other system or devices can use the information to determine what is in the package 185. The fewer systems or devices that are informed of the contents in the package may reduce the risk that a nefarious actor can use this information to steal the item. In another example, the package 185 may include a shipping label which has personal or private information such as a name of a person, her address, phone number, etc. Assigning an obfuscated ID to the package (rather than using the personal information as an ID) makes it more difficult for a nefarious actor to get ahold of the personal information and link the package to a particular person. Thus, the obfuscated ID provides a layer of protection both to the items in the package as well as any personal or private information on the package.

The image processor 147 evaluates the captured image (or images) of the package 185 to identify a destination for the package 185. For example, the image may include the shipping label on the package or a UPC. The image processor 147 can identify the portion of the image that includes routing information (e.g., the bar code) and then determine a destination corresponding to the package. In one embodiment, the image processor 147 transmits the routing information identified from the package to the inventory tracking system 105 but does not transmit any portion of the image that contains private or personal information or that may indicate the item in the package is a high value item such as a brand, a manufacturer, etc.

In one embodiment, the image processor 147 ensures that the captured image is not transmitted out of firmware in the controller 140. For example, the captured image may be deleted without transmitting the image to software in the controller 140 or to the inventory tracking system 105 or the item-sortation machine 160. Instead, using firmware, the image processor 147 evaluates the captured image to identify routing information for the package by decoding a bar code or UPC on the package. The scanner 130 can transmit the routing information of the package to the inventory tracking system 105 while deleting the captured image. As such, the data representing the captured image may not leave the firmware of the controller 140, which mitigates the risk that private information on the package or information about the item in the package can be obtained by a nefarious actor. Put differently, because the raw data of the captured image is not be transmitted to other systems or devices in the system 100 (which may have less stringent security protections or be under the control of a third party), this reduces the likelihood the captured images could be misappropriated by a nefarious actor who can then pull the private information from the images.

However, in another embodiment, the captured images are sent to a different system. For example, the scanner 130 may not have compute capabilities sufficient to process the captured images, in which case the images may be transmitted to a separate compute system to be processed by an image processor. However, this transfer may take place in a secure network or using encrypted data to protect the captured images. For example, the scanner 130 may transmit the captured images to the inventory tracking system 105 using encrypted data but may not send the captured images to the item-sortation machine 160. In this example, the inventory tracking system 105 identifies the routing information on the package rather than the image processor 147 on the scanner 130.

In addition to identifying the routing information, the image processor 147 can retrieve other information from the captured images about the package 185 which can be stored in memory 150 as scan data 155. For example, the image processor 147 may evaluate one or more images to determine a height, width, length, and/or color of the package. Moreover, the processor 147 may determine a 3D profile for the package 185 such as its shape, number of sides, slope of the sides, etc. The processor 147 can also determine a type of the package 185 such as whether it is an envelope, box, crate, plastic wrapping, etc. This ancillary information about the package 185 can be stored as scan data 155 (also referred to as ancillary data) in the memory 150 which can then be sent to the inventory tracking system 105. Further, the image processor 147 can derive metrics related to the captured image which can assign grades to the images (e.g., A, B, and C or 1, 2, and 3) to judge their quality based on the lighting in the images, the orientation of the image relative to the orientation of the label in free space, readability of the text or bar codes in the image, and the like. These metrics about the images can also be stored in the scan data 155.

In one embodiment, the scan data 155 can include information about the scanner 130 itself which was not derived from processing the captured images. For example, the controller 140 may store in the scan data 155 which camera (or cameras) 135 in the scanner 130 captured an image of the bar code or UPC, an orientation of the camera 135, whether a camera 135 has malfunctioned, and the like. Although not shown in FIG. 1, the scanner 130 can have other sensors in addition to the camera 135. For example, the scanner 130 can include a scale for weighing the package 185. The weights of the packages 185 can also be stored as the scan data 155.

In one embodiment, the controller 140 uses a specialized machine communication protocol to transmit the obfuscated ID, the routing information for the package 185 (e.g., decoded bar code or UPC data), and the scan data 155 (or other ancillary data) to the inventory tracking system 105. Moreover, the scanner 130 can transmit the obfuscated ID to the item-sortation machine 160. In this manner, both the inventory tracking system 105 and the item-sortation machine 160 have the obfuscated ID so when communicating messages concerning the package 185, the obfuscated ID can be used to identify the package 185 relative to other packages 185 that the scanner 130 or the item-sortation machine 160 may be currently processing.

The inventory tracking system 105 includes a machine controller 110 that receives the obfuscated IDs 115 and the scan data 155 from the scanner 130. As mentioned above, the obfuscated IDs 115 are used to identify packages 185 previously scanned by the scanner 130 while the scan data 155 can include data derived from the captured images (e.g., routing information, physical attributes of the scanned packages 185, or image metrics), data about the scanner 130 (e.g., the status of the cameras 135), or data from additional sensors (e.g., a scale). The machine controller 110 uses the obfuscated IDs 115 to transmit messages or commands to the item-sortation machine 160 to sort the package 185. For example, the machine controller 110 may identify using the routing information in the scan data 155 the postal code corresponding to the destination of the package 185. The machine controller 110 can then map that postal code to a particular tote or container on or near the item-sortation machine 160 and transmit a command to the machine controller 110 to move the package 185 (which has moved from the scanner 130 to the item-sortation machine 160 as shown by arrow 195) to the identified tote or container.

Using the obfuscated ID in the command, the item-sortation machine 160 can identify which package 185 the command is intended. That is, the item-sortation machine 160 may currently be sorting multiple packages 185. For example, each time the item-sortation machine 160 receives a package from the scanner 130, the scanner 130 can transmit the obfuscated ID 115 to the item-sortation machine 160. As such, the item-sortation machine 160 can correlate the most recently received package 185 (or the package it receives next from the scanner 130) to the obfuscated ID 115. As the package 185 moves around the item-sortation machine 160, the machine 160 can transmit information to the inventory tracking system 105 and receive commands from the inventory tracking system 105 using the obfuscated ID 115. In this manner, the item-sortation machine 160 can simultaneously track multiple packages that are being sorted using different obfuscated IDs 115.

The item-sortation machine 160 includes robots 165, bins 170, and a controller 175. In one embodiment, the robots 165 are wireless controlled machines that carry packages 185 received from the scanner 130 to a corresponding one of the bins 170 in response to commands received from the inventory tracking system 105. The item-sortation machine 160 may include a network of tracks that the robots 165 can traverse to reach the bins 170. For example, the robots 165 may include individual power sources (e.g., a battery or large capacitor) for powering wheels that move the robots 165 along to the tracks. Moreover, the robots 165 may include a package receiving apparatus for retrieving the package 185 and moving the package 185 into one of the bins 170. The package receiving apparatus may include a conveyor belt or a robotic arm for grasping the package 185. For example, using a conveyor belt, a robot 165 can pull a package from a conveyor belt in the scanner 130 onto the robot 165. Once the robot 165 is next to (or above) the desired bin 170, the conveyor belt on the robot 165 can eject the package into the bin 170.

The bins 170 may be arranged in an array on one side of the item-sortation machine 160 where a track permits the robots 165 to navigate to any one of the bins 170. In another example, the bins 170 may be disposed at the ends of chutes or conveyors where the robots 165 eject the packages 185 onto the desired chute or conveyor which move the package 185 to the corresponding bin 170. As mentioned above, the bins 170 can correspond to different possible destinations for the packages 185 such as different warehouses, geographic areas, postal codes, etc.

The controller 175 stores the obfuscated IDs 115 and facilitates communication with the inventory tracking system 105 and the scanner 130. Moreover, the controller 175 also transmits commands to, and receives response from, the robots 165 in order to sort the received packages 185. In one embodiment, the controller 175 uses wireless communication to communicate with antennas and transceivers mounted on the robots 165. The controller 175 may transmit a command to a robot 165 currently carrying a package 185 to move to a particular bin location. Once there, the robot 165 can inform the controller 175, which in turn can command the robot 165 to eject the package 185 into the bin 170. The robots 165 can also inform the controller 175 of any problems or errors that may occur when sorting the package 185 e.g., a robot 165 malfunctions or a package 185 fell off a robot 165. The controller 175 can rely this information to the inventory tracking system 105.

The network 125 can be a local area network (LAN) or a wide area network (WAN)—e.g., the internet. For example, the inventory tracking system 105 may be hosted on or more computer systems that are in the same facility (e.g., a warehouse or campus) as the item-sortation machine 160 and the scanner 130. In this scenario, the network 125 may be a LAN. However, the inventory tracking system 105 may be hosted in a cloud computing environment which may be formed by computing resources that are located in a different geographic location than the facility that contains the item-sortation machine 160 and the scanner 130. In that case, the network 125 may be a WAN. In either case, by using the obfuscated IDs 115 to transmit information and commands related to the packages 185 across the network 125, the system 100 can limit the amount of information a nefarious actor can learn about the items in the packages 185 or any personal or sensitive information disposed on the packages 185.

Figure 2:
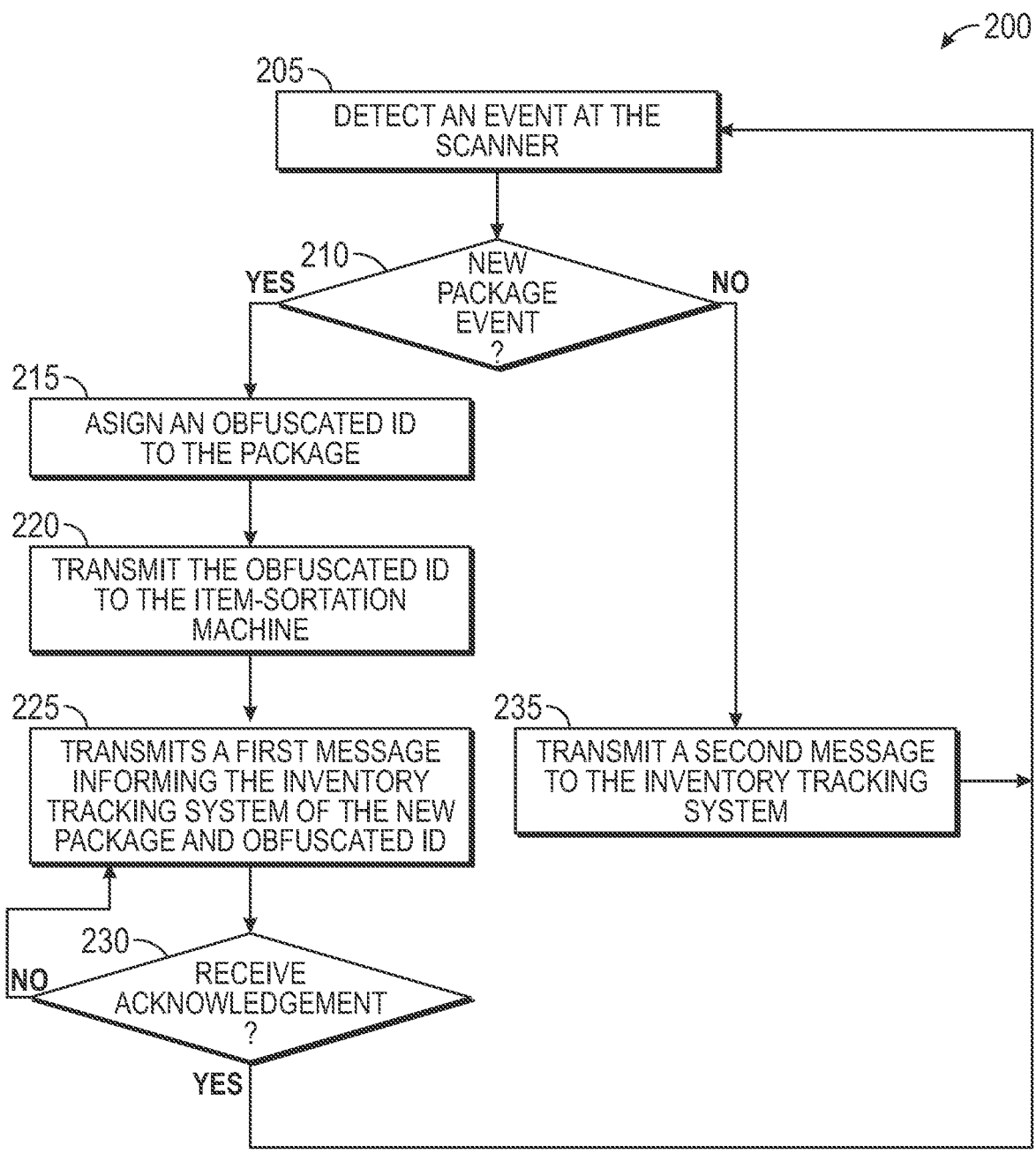
FIG. 2 is a flowchart for assigning an obfuscated ID to a package, according to various embodiments.

FIG. 2 is a flowchart of a method 200 for assigning an obfuscated ID to a package, according to various embodiments. At block 205, a controller detects an event at the scanner 130. The event can include a new package event (where a newly received package is received at the scanner), a scan event (where a bar code or UPC on the package is identified), a confirmation event (where the scanner acknowledges a command or request from the inventory tracking system), or a troubleshooting event (where the scanner detects a problem with device or application).

If, at block 210, the controller in the scanner determines the event is a new package event, the method 200 proceeds to block 215 where the ID selector assigns an obfuscated ID to the newly received package. For example, the ID selector may maintain a count and assign the current value of the count to the newly received package. The ID selector can them increment the count. The count could then be reset after a predetermined time period—e.g., each hour or each day. As such, the obfuscated ID is independent of the routing information derived from the package such as data derived from the bar code as well as any personal information that may be in the shipping label.

At block 220, the controller in the scanner transmits the obfuscated ID to the item-sortation machine. For example, the scanner may include movement means for moving (or ejecting) a newly received package to the item-sortation machine. When doing so, the controller can send the obfuscated ID assigned to the package being moved to the item-sortation machine. That way, the item-sortation machine can correlate the package currently being received from the scanner to the obfuscated ID. In this manner, both the scanner and the item-sortation machine can assign the same obfuscated ID to the same package.

At block 225, the controller in the scanner transmits a first message informing the inventory tracking system of the new package and the obfuscated ID. For example, the scanner may include an optical eye that indicates when a new package has entered (or is entering) into a scan area of the scanner. In response, the controller can transmit a message to the inventory tracking system indicating a new package has been received and the obfuscated ID assigned to that package.

In another embodiment, the scanner may transmit multiple messages to the inventory tracking system when a new package is received. For example, a first message can indicate that the optical eye was broken and a new package is being received which may be sent before the scanner has captured an image of the item or assigned an obfuscated ID. Later, after capturing one or more images of the package and decoding any bar codes or UPCs on the package using the images, the scanner can send a second message to the inventory tracking system that includes the obfuscated ID and the routing information (e.g., the bar code data or the UPC data decoded from the images).

Moreover, the scanner may also transmit other ancillary data (e.g., the scan data 155 in FIG. 1) about the package to the inventory tracking system such as the physical dimensions or attributes of the package, metrics regarding the captured images, status of the camera, orientation of the cameras, and the like. This information may be sent as part of the new package event or may be sent later in a subsequent message.

At block 230, the controller in the scanner determines whether an acknowledgement is received from the inventory tracking system. Put differently, the controller ensures that the inventory tracking system received the message (or messages) sent at block 225 regarding the new package event. If not, the method 200 returns to block 225 where the scanner resends the message. If so, the method 200 returns to block 205 to wait for a new event.

If the controller on the scanner does not detect a new package event at block 210, the method 200 proceeds to block 235 where the controller transmits a second message to the inventory tracking system. For example, the second message may correspond to any of the events described above (e.g., a scan event, confirmation event, troubleshooting event, package leaving event). The scan event can include the ancillary data about the package and the obfuscated ID. The confirmation event may inform the inventory tracking system that it has performed an action corresponding to a received command. For example, the inventory tracking system may instruct the scanner to stop sending new packages to the item-sortation machine because the item-sortation machine has jammed or malfunctioned. Using a confirmation event, the scanner can tell the inventory tracking system it has stopped. The troubleshooting event can indicate when a hardware device (e.g., a camera) or firmware or a software application on the scanner has malfunctioned. A package leaving event can inform the inventory tracking system when the scanner has finished scanning a package and is passing (or has passed) the package to the item-sortation machine. The method 200 can repeat as additional events are detected by the scanner.

In one embodiment, the messages sent between the scanner, inventory tracking system, and the item-sortation machine when performing the method 200 may use a specialized machine communication protocol which is described in more detail later.

Figure 3:
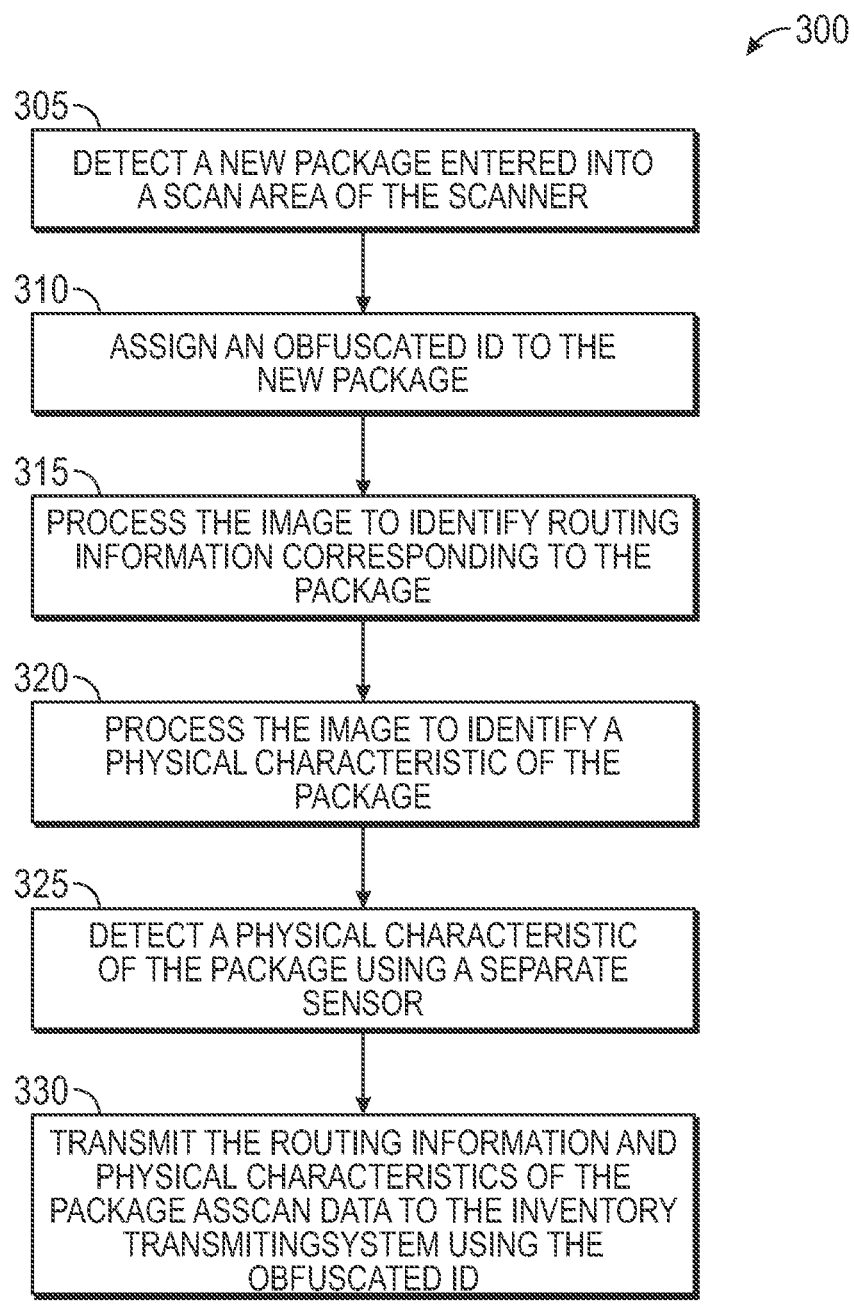
FIG. 3 is a flowchart for transmitting ancillary data when scanning bar codes on a package, according to various embodiments.

FIG. 3 is a flowchart of a method 300 for transmitting ancillary data when scanning bar codes on a package, according to various embodiments. At block 305, the scanner detects a new package entering into a scan area of the scanner. The scanner can include an optical eye where a beam of light is interrupted when a new package moves into the scan area. In another embodiment, the scanner includes a pressure sensor which can detect when a package is placed in the scan area.

At block 310, the ID selector assigns an obfuscated ID to the new package which can be done in a same manner as block 215 of the method 200.

At block 315, the image processor processes a captured image to identify routing information corresponding to the package. The image processor can use multiple images to identify the routing information which can include one or more bar codes or UPCs. In another embodiment, the routing information may be text printed on the package such as a postal code. However, in one embodiment, the image processor may purposefully delete or ignore personal or sensitive data in the captured images such as a name on a shipping label or a brand name or manufacturer. Moreover, the image processor may delete the captured images so that the images never leave the firmware in the controller. For example, the captured images may not be stored in a non-volatile memory such as a hard disk or the captured images are not transmitted to an external device.

At block 320, the image processor processes the image to identify physical characteristics of the package. That is, in addition to identifying the routing information, the image processor can identify the height, width, length, color, and shape of the package. Moreover, the image processor can identify a type of the packaging such as whether it is soft (e.g., a bubble mailer or plastic wrap) or rigid (e.g., a cardboard box).

At block 325, the scanner detects a physical characteristic of the package using a separate sensor (e.g., a sensor other than the camera used to capture the images). For example, the scanner may include a scale for weighing the package.

At block 330, the controller in the scanner transmits the routing information and physical characteristics of the package as scan data to the inventory tracking system using the obfuscated ID. Using a communication protocol, the controller may package the scan data into one or more messages which are transmitted to the inventory tracking system. The inventory tracking system can use some of the information in the messages to generate commands to the item-sortation machine or to the scanner. However, some of the information in the message may be ignored by the inventory tracking system. Nonetheless, the inventory tracking system can log the unused scan data which can be used to detect trends associated with the packages (e.g., the packages that are the hardest or easiest to scan, or the most common shape of the packages) or the scanner (e.g., a camera that is malfunctioning or unable to read the majority of the text or bar codes on the package).

Figure 4:
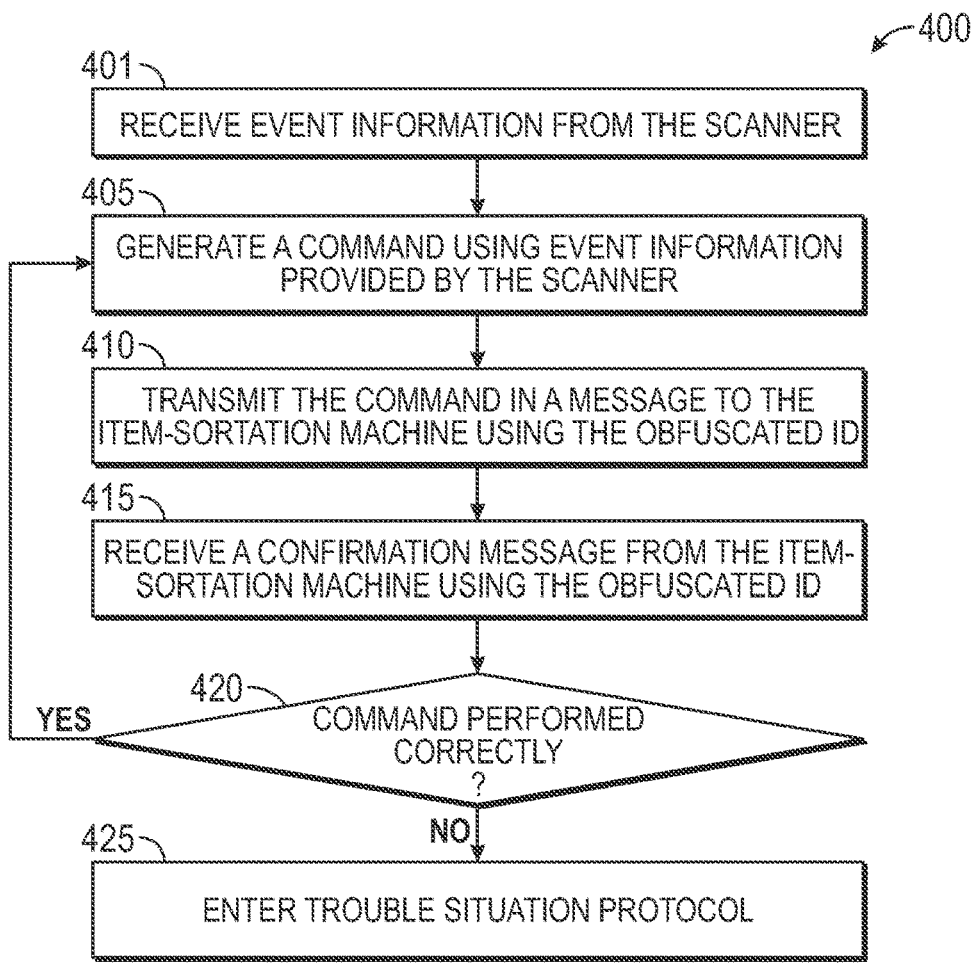
FIG. 4 is a flowchart for transmitting commands to an item-sortation machine, according to various embodiments.

FIG. 4 is a flowchart of a method 400 for transmitting commands to an item-sortation machine, according to various embodiments. At block 401, the machine controller in the inventory tracking system receives event information for the package from the scanner. If the event is a new package event, the event information may include the scan data (e.g., the routing information and physical characteristics of the package) as well as the obfuscated ID. If the event was an ejection event, the event information may include the obfuscated ID and a time stamp when the package was moved to the item-sortation machine. Moreover, the event information can come from other entities besides the scanner. For example other processes in the facility may wish to control or affect how the package is sorted by the item-sortation machine. As such, the machine controller may receive event information from those processes at block 405 and generate commands to the item-sortation machine which affect how the package is processed.

At block 405, the machine controller in the inventory tracking system generates a command using event information provided by the scanner. That is, the machine controller can generate the commands using the routing information and/or scan data provided by the scanner discussed in methods 200 and 300. In one embodiment, the command instructs the item-sortation machine to sort a package into a bin that corresponds to a destination of the package. For example, the inventory tracking system can use the routing information provided by the scanner to identify the destination of the package (e.g., a postal code, geographic region, or a warehouse) and then generate a sort command for the item-sortation machine to sort the package into a bin corresponding to the destination. A sort command is just one example of a command the inventory tracking system may generate to the item-sortation machine. Other commands could include shut down commands, status inquiry commands, or troubleshooting commands.

At block 410, the machine controller transmits the command in a message to the item-sortation machine using the obfuscated ID. Because the item-sortation machine may have already received the obfuscated IDs from the scanner and correlated the IDs to received packages, the item-sortation machine can determine which of the packages corresponds to the command. That is, the item-sortation machine can identify, using the obfuscated ID, which package the command correspond to even if the machine is currently sorting multiple packages.

At block 415, the machine controller receives a confirmation message from the item-sortation machine using the obfuscated ID. For example, after completing an action or actions corresponding to the command received by the inventory tracking system, the controller in the item-sortation machine sends a confirmation message to the machine controller in the inventory tracking machine to inform that machine controller that the command was performed successfully or if there was a problem with performing the command.

At block 420, if the command was performed successfully, the method 400 returns to block 405 where the machine controller generates a new command for the same package or for a different package being sorted by the item-sortation machine. However, if the command was not performed successfully, the method 400 proceeds to block 425 where the machine controller enters a troubleshooting protocol which may include re-sending the command or informing an associate or technician of the problem.

Figure 5:
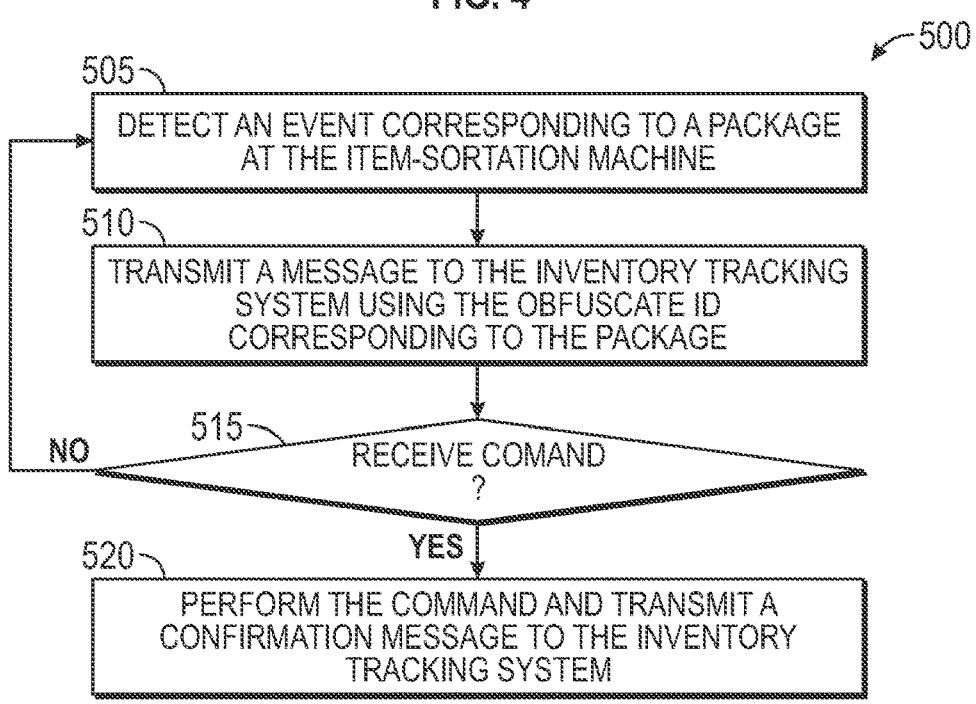
FIG. 5 is a flowchart for detecting events at an item-sortation machine, according to various embodiments.

FIG. 5 is a flowchart of a method 500 for detecting events at an item-sortation machine, according to various embodiments. At block 505, the controller in the item-sortation machine detects an event corresponding to a package. The event could include a stow event, a mis-stow event, a failure event, or a maintenance event. The stow event could be when a robot has successfully placed a package in the desired bin in response to a command received from the inventory tracking system. The mis-stow event may occur when a robot placed the package in the wrong bin (e.g., a bin corresponding to a wrong destination for the package). The failure event may be when a package falls of the robot during transit or when a bin is full and does not have room for the package. The maintenance event may occur when a robot jams or malfunctions.

At block 510, the controller in the item-sortation machine transmits a message to the inventory tracking system using the obfuscated ID corresponding to the package. That is, the controller determines a package corresponding to the event and then uses the obfuscated ID corresponding to the package to send a message to the machine controller in the inventory tracking system with details regarding the event.

At block 515, if a command is not received from the machine controller in the inventory tracking system, the method 500 returns to block 505. However, if a command is received, the method 500 proceeds to block 520 where the controller in the item-sortation machine performs the command and transmits a confirmation message to the inventory tracking system. In one embodiment, the controller in the item-confirmation machine may issue a plurality of individual commands to a robot in order to perform the command received from the machine controller in the inventory tracking system. That is, the received command may indicate the package should be stowed in the bin corresponding to a particular warehouse. In response, the controller in the item-sortation machine may issue a series of commands which cause a robot to pick up the package, move the package to a location next to or above the appropriate bin, and stow the package into the bin. After completing the series of commands, the controller informs the inventory tracking system using the confirmation message. Moreover, if something went wrong, the controller can send an error message to the inventory tracking system so the machine controller in the inventory tracking system can enter a troubleshooting protocol as described in block 425 of the method 400.

Figure 6:
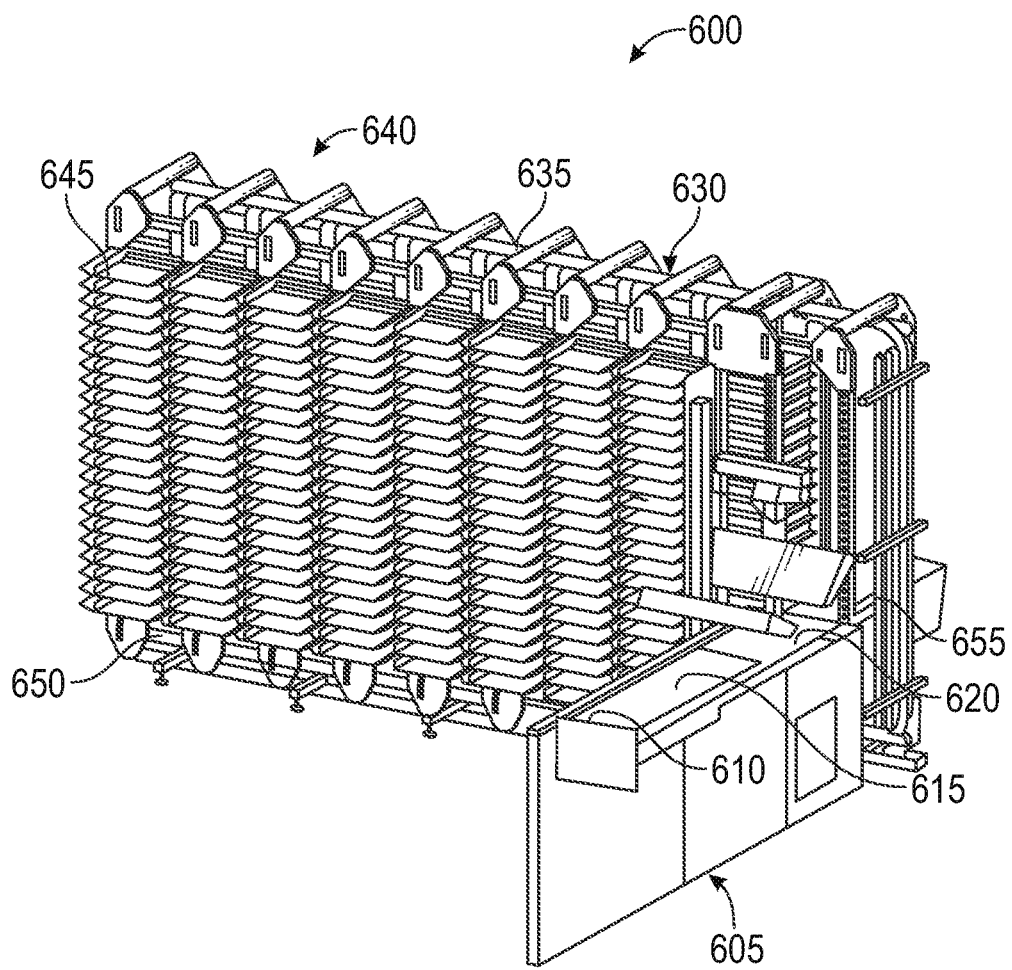
FIGS. 6 and 7 illustrate an apparatus for sorting items, according to various embodiments.
Figure 7:
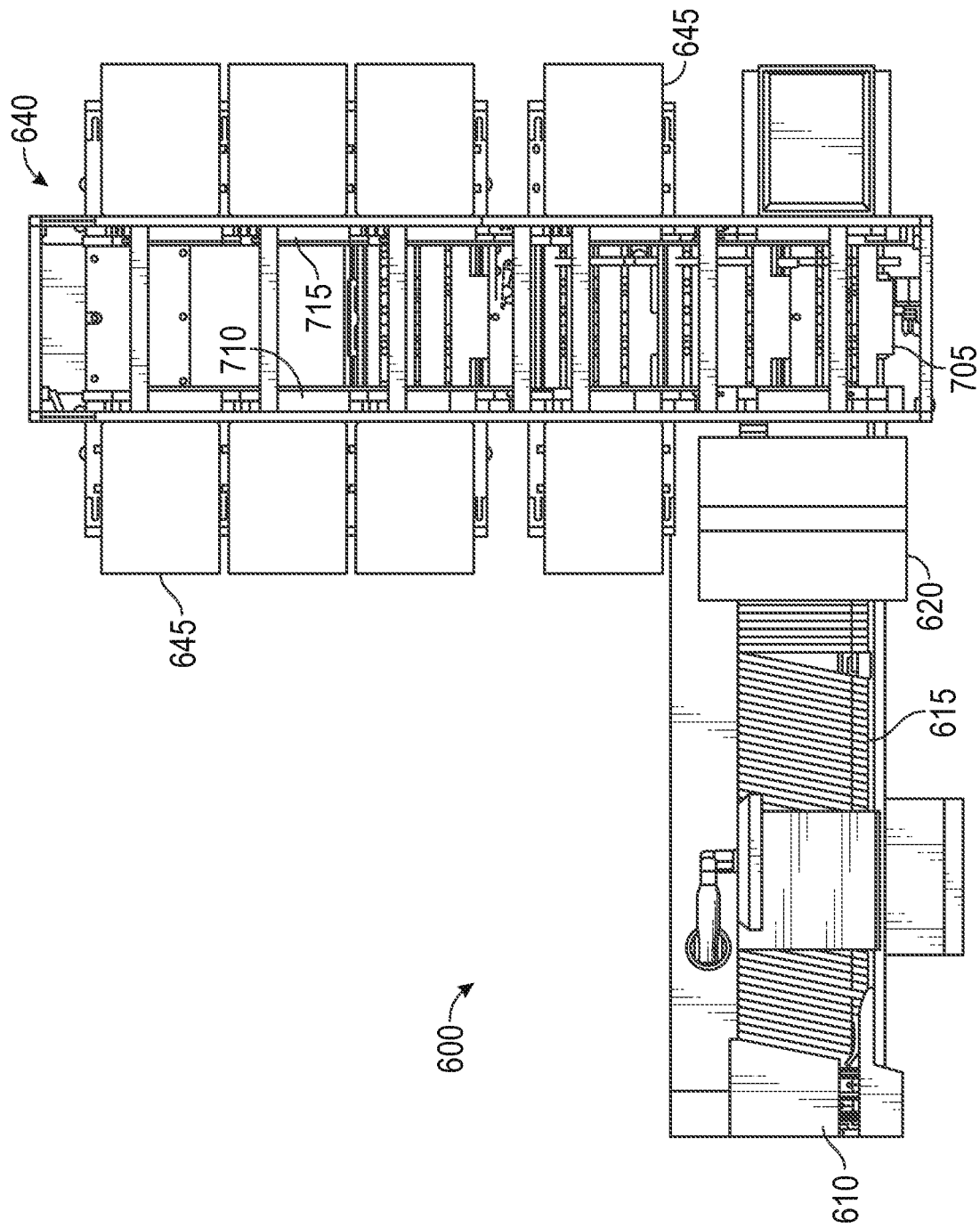

Referring now to FIGS. 6 and 7, an apparatus which is one example of an item sortation machine 160 shown in FIG. 1 for sorting items such as documents or mail pieces is designated generally 600. The apparatus 600 includes a plurality of delivery cars 705 (e.g., the robots 165 shown in FIG. 1) to deliver items to a plurality of sort locations, such as output bins 645 (e.g., bins 170 shown in FIG. 1). At a loading station 655, each car 705 receives an item from an input station 605 and delivers it to the appropriate bin.

The cars 705 travel along a track 630 to the sort locations. The track has a horizontal upper rail 635 and a horizontal lower rail 650, which operates as a return leg. A number of parallel vertical track legs extend between the upper rail 635 and the lower return rail 650. In the present instance, the bins 645 are arranged in columns between the vertical track legs.

After a piece is loaded onto a car, the car travels upwardly along two pairs of vertical tracks legs and then horizontally along two upper tracks. The car 705 travels along the upper rail until it reaches the appropriate column containing the bin for the piece that the car is carrying. The track 630 may include gates to direct the car 705 down the vertical legs where the car stops at the appropriate bin. The car 705 then discharges the piece into the bin using a transport device or system.

After discharging the piece, the car 705 continues down the vertical legs of the column until it reaches the lower rail 650 which the car follows until returning to the loading station 655 to receive another item.

The cars 705 are semi-autonomous vehicles that each have an onboard power source and an onboard motor to drive the cars along the track 630. The cars also include a loading/unloading mechanism, such as a conveyor, for loading pieces onto the cars and discharging the pieces from the cars.

Since the apparatus 600 includes a number of cars 705, the positioning of the cars is controlled to ensure that the different cars do not crash into each other. In one embodiment, the apparatus 600 uses a master controller that tracks the position of each car 705 and provides wireless commands to each car to control the progress of the cars along the track. The master controller may also control operation of the various elements along the track, such as the gates. Further, the control system may output a heartbeat signal, e.g., using a heartbeat controller. The cars 705 perform the commands to move the pieces throughout the apparatus 600 so long as the heartbeat signal is active as described above.

At the input station 605, the mail pieces are separated from one another so that the pieces can be conveyed serially to the loading station 655 (which may include the scanner 130 in FIG. 1) to be loaded onto the cars 705. Additionally, at the input station information is determined for each piece using, for example, a bar code scanner or a mailing address so that the piece can be sorted to the appropriate bin.

A variety of configurations may be used for the input station, including manual or automatic configurations or a combination of manual and automated features. In a manual system, the operator enters information for each piece and the system sorts the mail piece accordingly. In an automatic system, the input system includes elements that scan each mail piece and detect information regarding each piece. The system then sorts the mail piece according to the scanned information.

In an exemplary manual configuration, the input system includes a work station having a conveyor, an input device, and a monitor. The operator reads information from a mail piece and then drops the piece onto a conveyor that conveys the piece to the loading station 655.

In an exemplary automatic configuration, the system includes an imaging station, having an imaging device such as a high speed line scanning camera. In one example, the imaging station scans a bar code on each mail piece to detect information regarding the destination for each piece. The system analyzes the image data to determine the destination information and then controls the cars to move the piece into a bin corresponding to the destination.

FIGS. 6 and 7 illustrate such an automated system. A feeder 610 in the input bin serially feeds mail pieces from the input bin to a conveyor 615. An imaging station 620 positioned along the conveyor scans the mails pieces as the pieces are conveyed to the loading station 655. The apparatus 600 analyzes a bar code or mailing address to read information for the mail piece.

The conveyor 615 conveys the mail piece to the loading station 655 where it is loaded onto a car 705.

The input station 605 may be configured in a wide range of options. The options are not limited to those configurations described above, and may include additional features, such as an automated scale for weighing each piece, a labeler for selectively applying labels to the mail pieces and a printer for printing information on the mail pieces or on the labels.

In one embodiment, the apparatus 600 includes a plurality of input stations which may increase the feed rate of pieces. In addition, the input stations may be configured to process different types of items. In this way, each input station could be configured to efficiently process a particular category of items. For instance, if the system is configured to process documents, such as mail, one input station may be configured to process standard envelopes, while another input station may be configured to process larger mails, such as flats. Similarly, one input station may be configured to automatically process mail by scanning it and automatically determining the recipient. The second input station may be configured to process rejects, such as by manually keying in information regarding the recipient.

The system includes a sorting station 640 which includes an array of bins 645 for receiving the pieces. Additionally, the sorting station 640 includes the track 630 for guiding the cars 705 to the bins 645.

In one embodiment, during transport, the cars travel up a pair of vertical legs from the loading station 655 to the upper rail 635 (in one example, the cars actually travel up two pairs of rails because the track includes a forward track and a parallel opposing track). The car then travels along the upper rail until reaching the column having the appropriate bin. The car then travels downwardly along two front vertical posts and two parallel rear posts until reaching the appropriate bin, and then discharges the mail piece into the bin. The car then continues down the vertical legs until reaching the lower horizontal rail 650. The car then follows the lower rail back toward the loading station.

As can be seen in FIG. 7, the track 630 includes a front track 710 and a rear track 715. The front and rear tracks 710, 715 are parallel tracks that cooperate to guide the cars around the track. In one embodiment, each of the cars includes four wheels: two forward wheel and two rearward wheels. The forward wheels ride in the front track, while the rearward wheels ride in the rear track. It should be understood that in the discussion of the track the front and rear tracks 710, 715 are similarly configured opposing tracks that support the forward and rearward wheels of the cars. Accordingly, a description of a portion of either the front or rear track also applies to the opposing front or rear track.

A Specialized Machine Communication Protocol

The preceding embodiments are not limited to a particular communication protocol for transmitting messages between the scanner, inventory tracking system, and the item-sortation machine. For example, the commands and messages transmitted by these components and systems can use general TCP/IP communication protocol to transmit data, or any other sufficient messaging protocol. However, the embodiments below describe a specialized machine communication protocol with a defined message template for forming messages or commands. These messages and commands can be embedded within one or more TCP/IP packets and transmitted across a LAN or WAN.

In one embodiment, the format can include both strong and weak fields separated by delimiters to provide information and commands between the various systems and devices. For example, the format may require that the first one or two fields in each message are strongly typed, and thus, must include one of a known list of attributes. However, the rest of the message can include any number of weakly typed fields where the attributes (and their order) can vary. In this manner, the specialized machine communication protocol provides flexibility for transmitting messages between the various control systems and devices by providing both strongly and weakly typed fields.

FIG. 8 illustrates a message template 800 for a machine communication protocol, according to various embodiments. The message template 800 may define a format followed by each message to be compatible with the machine communication protocol. In this example, the template 800 includes a start character 805 and an end character 835 which define an beginning and an end of the message. Because the message may be chunked up (or divided) and transmitted in multiple network packets, using predefined start and end characters 805, 835 enable the receiving device or system to identify the complete message when the message can span between multiple network packets. Put differently, the data in the message may be too large for one network packet, and thus, may be transmitted using multiple data packets which are reassembled at the destination using the start and end characters 805, 835. In one embodiment, the start and end characters 805, 835 are predefined ASCII characters.

The message template 800 includes one or more strong fields 810 and one or more weak fields 820. The strong fields 810 are strongly typed fields which, in one embodiment, include one of a list of predefined values 815. That is, in order for the strong fields 810 to be compatible, the values 815 in each of the strong fields 810 should include one of the predefined values from the list. If not, the value in the strong field 810 is invalid and may cause an error or an exception at the receiving entity.

In one embodiment, the message template 800 includes at least one strong field 810. In another embodiment, the message template 800 includes two, three, four, or more strong fields 810. Moreover, the strong fields 810 may have set locations within the template 800. For example, the template 800 may require that the first two fields in the message are strong fields 810. If a sender attempts to put weak fields 820 in the first or second fields in the message, it may cause an error or exception at the receiving controller. Put differently, the message template 800 may define a required location (or locations) in the messages that should contain a value 815 in a strong field 810. In this manner, when parsing a received message, the receiver controller knows that certain locations or fields in the message should be strong fields 810.

In one embodiment, each strong field 810 may have a corresponding list of predefined values 815. For example, the list of possible values 815A for the strong field 810A may be different than the possible values 815B for the strong field 810B. For example, the list of potential values 815A for the strong field 810A may be different types of machines, while the list of values 815B for the strong field 810B may be different commands for that type of machine. For example, a receiving controller may route the message to a different socket or thread depending on the value 815A in the strong field 810A. Once received, the socket or thread uses the value 815B in the strong field 810B to determine a corresponding action to take. For example, the value 815B may instruct the thread or socket to move a robot, or log the data in the weak fields 820 into a database. In another embodiment, the value 815B may inform the receiving controller of an event at the sending controller (e.g., a new package event, a scan event, an error event, a malfunction, etc.). In any case, the receiving controller can use the strong fields 810 to determine how to process the data in the message or identify a command or action to perform in response to the message.

Unlike the strong fields 810, the data in the weak fields 820 may be weakly typed such that attributes 825 and corresponding values 830 may not be selected from a predefined or set list of values. That is, the attributes 825 and values 830 are flexible and change for different machines, different controllers, and different systems. For example, the number of weak fields 820 in a message sent from the inventory tracking system to the scanner may be different than the number of weak fields 820 in messages transmitted from the inventory tracking system to the item-sortation machine. Further, the messages transmitted between the same two systems or devices may have different numbers of weak fields 820. For example, when informing the inventory tracking system of new package event, the scanner may send a first message that includes only one weak field 820. However, when informing the inventory tracking system of a scan event, the scanner may send a second message that includes four weak fields 820. As such, the message template 800 permits the messages to include any number of weak fields 820 which can be in any order within the message.

In one embodiment, the attributes 825 include information that the transmitting controller wants to send to the receiving controller. For example, the attributes 825 could include a physical attribute of a scanned package, a status of the machine (whether a camera or robot has malfunctioned), or metrics regarding the machine or information gathered by a machine (e.g., metadata). The transmitting controller can decide to change the attributes 825 in a weak field 820 in response to different states of the machine or in response to a user request. For example, the user may want to track the output of a particular sensor in the machine. The user can instruct the controller in the machine to include the output of the sensor as an attribute 825 in a weak field 820 when sending messages to the inventory tracking system. The controller may add a new weak field 820 to its messages and insert the attribute 825 and particular value 830 of the attribute 825 which can be received by the inventory tracking system.

Because the message template 800 can have varying lengths depending on the number of the weak fields 820 and because the amount of data in the strong and weak fields 810, 820 can vary, the template 800 uses the end character 835 to indicate to the receiving controller when the message is complete. That is, the receiving controller can parse the message until reaching the end character 835. As described in more detail below, not all of the information in the weak fields 820 may be used by the receiving controller. Instead, some of the information in the message may be intended for use by another controller or by a user to determine trending or status information for a machine.

FIG. 9 illustrates a message 900 for a machine communication protocol, according to various embodiments. In one embodiment, the message 900 is formatted according to the message template 800 in FIG. 8. The message 900 includes the start character <STX>805 followed by two strong fields 810A and 810B. In this example, the strong field 810A indicates that the message 900 corresponds to Machine A. In one embodiment, the strong field 810A includes one of a predefined list of different machines (or different versions of a machine). For example, the message template 800 may define Machines A-E which can be indicated in the strong field 810A.

The strong field 810B indicates a type of the message 900. In this example, the strong field 810B indicates the message 900 is a Message Type D. The value in the strong field 810B may be selected from a predefined list of commands or events such as stow command, a sort command, a log command, a scan event, a new package event, a malfunction event, and the like. If the strong field 810B does not one of these events or commands, the message 900 may cause an error or exception at the receiving controller.

The fields in the message 900 (both the strong fields 810 and the weak fields 820) are divided from each other using a predefined primary delimiter 905. That is, the message template defines that a primary delimiter 905 should be used to separate different fields so that the controller receiving the message 900 can determine when one field ends and another begins. As such, there are primary delimiters 905 between each of the strong fields 810, between the strong field 810B and the weak field 820A, and between each of the weak fields 820. In this embodiment, the primary delimiters 905 are the pipe (|) or vertical bar symbol. However, any kind of symbol or combination of symbols or codes can be used (e.g., double pipes or a predefined ASCII character).

The message 900 includes four weak fields 820A-D. Each weak field 820 includes an attribute 825 and a value 830 assigned to that attribute. For example, the weak field 820A contains an attribute 825A "SEQUENCE" which indicates the weak field 820A contains the obfuscated ID assigned to package. This attribute has a value 830A of "12345" which is the actual value of the obfuscated ID assigned to the package. The message template uses secondary delimiters 910 to distinguish an attribute 825 from its corresponding value 830 in a weak field 820. That is, when parsing the message, the secondary delimiter 910 indicates the field is a weak field 820 where the data to the left of the secondary delimiter 910 is the attribute 825 and the data to the right is the corresponding value 830 of the attribute 825. Although in this example the secondary delimiter 910 is a tilde (~), any kind of symbol or combination of symbols or codes can be used.

The weak field 820B illustrates that the attributes 825 in the weak fields 820 can include multiple values 830. In FIG. 9, the "BARCODE" is an attribute 825B which has three different values 830B-D—i.e., "SP$_{00345}$", "BP1", and "BP2". For example, the package may have a label with three different barcodes which each correspond to one of the values 830B-D. One, two, or all three of the barcode values can be used as routing information by the inventory tracking system to determine how to move, sort, or process the package.

Although the message 900 include four weak fields 820, as mentioned above, the message template 800 may permit each message to have any number of weak fields 820. Further, the weak fields 820 can be in any order. For example, when sending another message that has the exact same fields as the message 900, the transmitting controller can re-arrange the weak fields 820 without causing an error or exception at the receiving controller.

Figure 10:
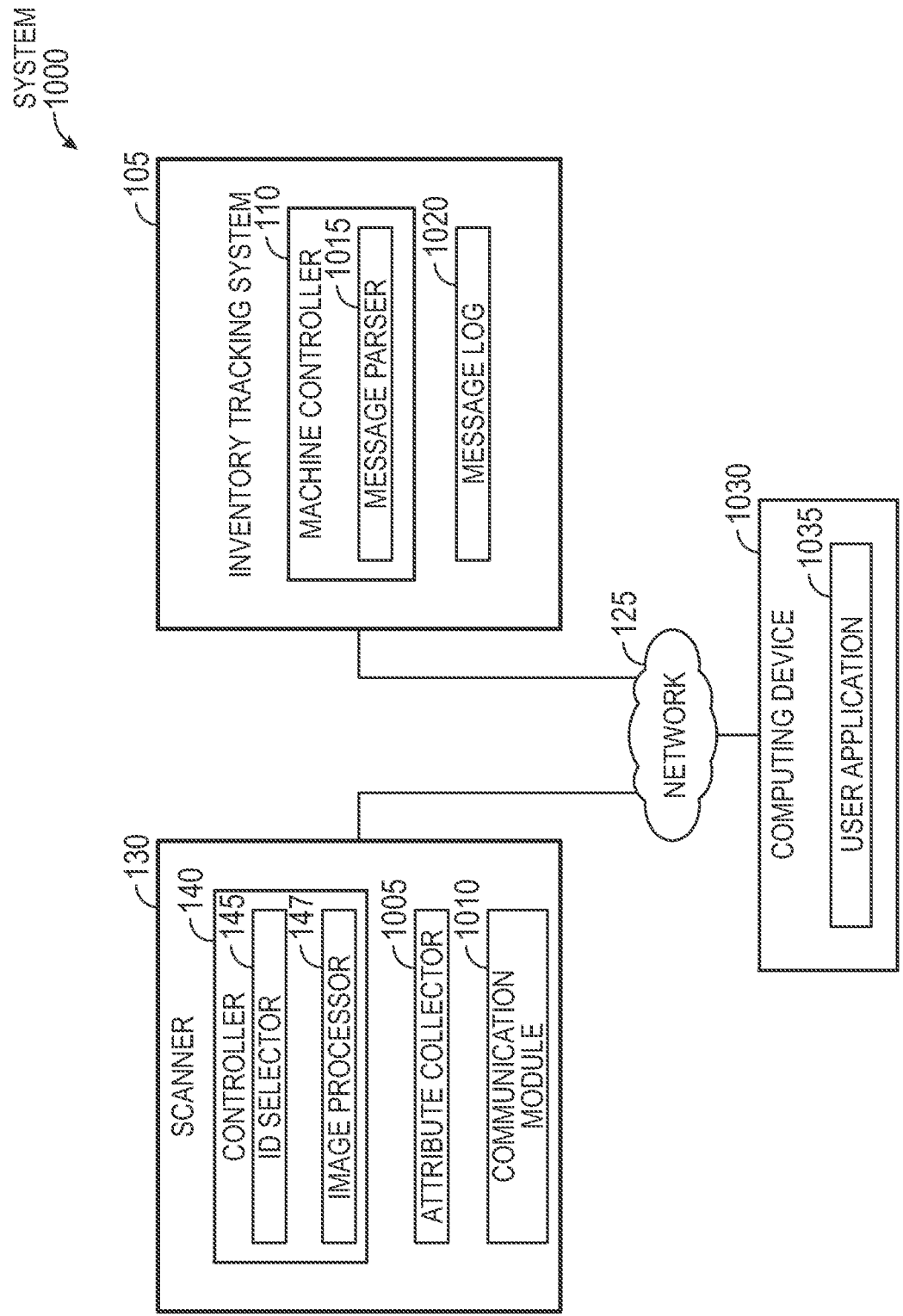
FIG. 10 is a block diagram of a system that processes messages sent using a machine communication protocol, according to various embodiments.

FIG. 10 is a block diagram of a system 1000 that processes messages sent using a machine communication protocol, according to various embodiments. The system 1000 includes the scanner 130, the inventory tracking system 105, and a computing device 1030 which are communicatively coupled using the network 125. Although the scanner 130 and inventory tracking system 105 are shown here as examples, the machine communication protocol and template described above can be applied to any type of inter or intra machine communication. For example, the communication can be between two different machines, between a machine and a remote controller, between a machine and a database, or between different components in the same machine.

The scanner 130 includes the controller 140, an attribute collector 1005, and a communication module 1010. The controller 140 further includes the ID selector 145 and the image processor 147 which were described above for assigning an obfuscated ID to received packages and processing images captured of the package. The attribute collector 1005 collects attribute values from the image processor 147 and other sensors in the scanner 130. For example, the image processor 147 can use captured images to identify the physical dimensions of the package and transmit a list of these attributes and their values to the attribute collector 1005. Similarly, a scale in the scanner 130 can weigh the package and inform the attribute collector 1005, or a camera can indicate it has malfunctioned and needs maintenance. In this manner, the attribute collector 1005 can store these attributes as scan data related to the package. Further, the attribute collector 1005 may generate metadata about the attributes. For example, the attribute collector 1005 may determine metrics that rank that images captured by multiple cameras in the scanner 130.

In one embodiment, a user application 1035 modifies the number of attributes collected by the attribute collector 1005. For example, the user application 1035 may be an application programming interface (API) which permits a user to control the function of the attribute collector 1005 without being physically located at the scanner 130. The user application 1035 can instruct the attribute collector 1005 to begin to collect other attributes (e.g., the package type) or stop collecting some attributes (e.g., stop collecting the color of the packages). For example, the user application 1035 may want to determine the most frequently used packaging type processed by the scanner 130 to identify the most important camera angle for reading the labels on those packages. As such, the user application 1035 instructs the attribute collector 1005 to identify the packaging type and the cameras which captured a readable image of the label on the package but ignore other attributes such as the size of the package or its weight.

The communication module 1010 can receive the attributes and their values from the attribute collector 1005 and then prepare a message (e.g., the message 900 in FIG. 9) which is then transmitted using the network 125. For example, the message may be transmitted to the inventory tracking system 105 to indicate a specific event occurred at the scanner 130 (e.g., a new package or scan event) or to log attribute information. As shown, the inventory tracking system 105 includes the machine controller 110 and a message log 1020. The message log 1020 can store messages received from the scanner 130 (and from other machines in a warehouse).

When receiving a new message, a message parser 1015 in the controller 110 can parse through the various fields in the message to determine how to process the image. For example, the parser 1015 can determine using one or more strong fields in the message the machine that transmitted the message and/or wehther the message is a command or a notice of an event. Using this information, the message parser 1015 can determine how to process the remaining fields in the message. For example, if the message corresponds to a scan event, the parser 1015 can look for the attribute "SEQUENCE" in one of the weak fields to determine the obfuscated ID of the package. As noted above, the message could contain other attributes in additional weak fields that may not be needed for the machine controller 110 to process the event. Nonetheless, these unrelated or unnecessary attributes may be stored in the message log 1020. Later, the user application 1035 may evaluate unrelated or unnecessary attributes stored in the message log 1020 to identify trending data or determine a status of the scanner 130.

Figure 11:
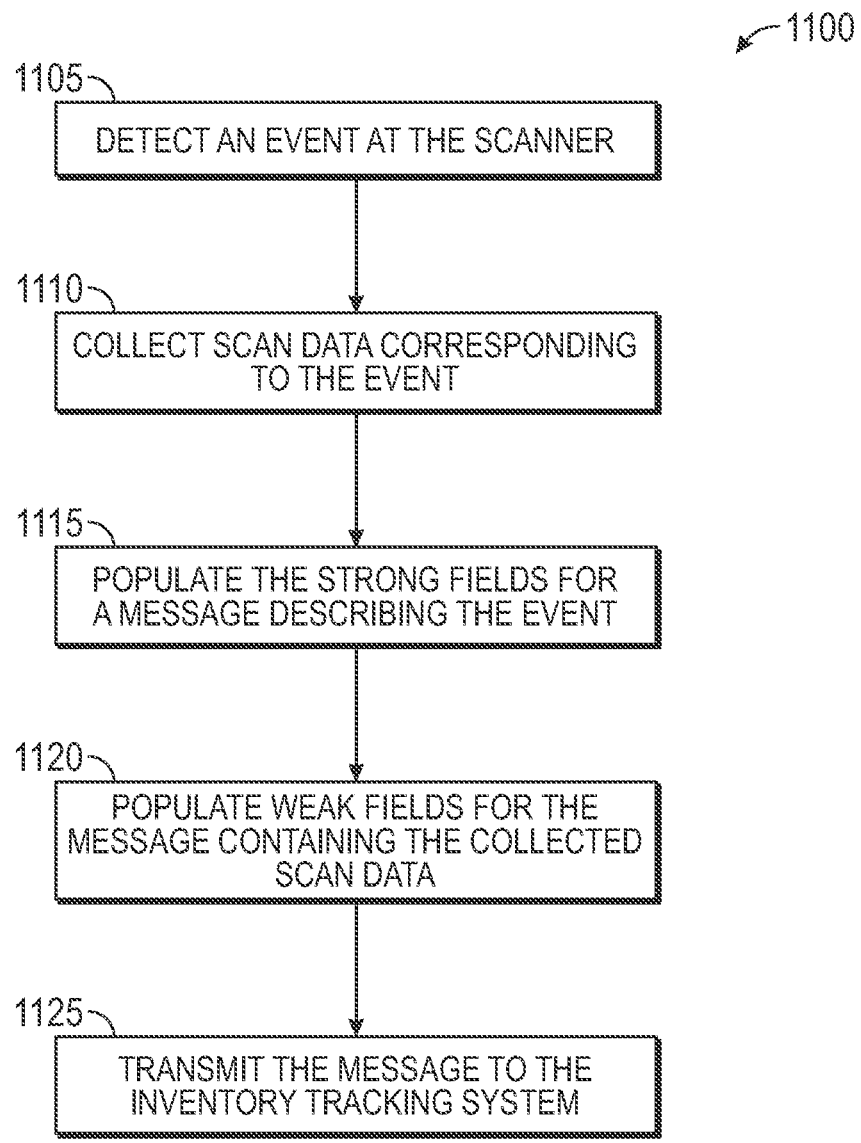
FIG. 11 is a flowchart for generating a message that includes strong fields and weak fields, according to various embodiments.

FIG. 11 is a flowchart of a method 1100 for generating a message that includes strong fields and weak fields, according to various embodiments. Although the method 1100 is described according to the perspective of the controller on the scanner, the method 1100 may be performed by any controller, whether a controller located on a machine (e.g., the scanner or the item-sortation machine) or a remotely located controller (e.g., the machine controller in the inventory tracking system).

At block 1105, the controller detects an event at the scanner such as a new package event, scan event, troubleshooting event, eject event, and the like. At block 1110, the attribute collector collects scan data corresponding to the event. As described above, the scan data may be sent to the attribute collector from the image processor or other sensors in the scanner such as cameras or a scale.

At block 1115, the communication module in the scanner populates the strong fields for a message to describe the event detected at block 1105. That is, the template corresponding to the machine communication protocol may define one or more strong fields that include one or a predefined list of values. Referring to the message 900 in FIG. 9, the first strong field 810A identifies the machine that sent the message (e.g., the scanner) while the second strong field 810B identifies the type of message (e.g., a message reporting out the event that occurred on the scanner). For different types of situations, the number of the strong fields in the messages may change. For example, for a machine communication protocol that is used for only one type of machine, the first strong field 810A may not be needed.

At block 1120, the communication module in the scanner populates weak fields for the message corresponding to the collected scan data. In one embodiment, the communication module receives at least one attribute (and its value) from the attribute collector and formats that data to form a weak field in the message according to the message template. For example, the communication module may put a delimiter between the attributes and its value. Moreover, the communication module can place separate delimiters between the different strong and weak fields as shown by the primary delimiters 905 in FIG. 9.

At block 1125, the communication module transmits the message to the inventory tracking system. In addition to the data fields, the communication module can add start and end characters to mark the beginning and end of the message. The communication module may embed the message in a separate network communication protocol—e.g., a payload or payloads in one or more TCP/IP packets. The message can then be transported using the packets through a WAN or LAN to reach the inventory tracking system. In another embodiment, the message may be transmitted directly to the inventory tracking system without being encapsulated using packets for a different communication protocol.

Figure 12:
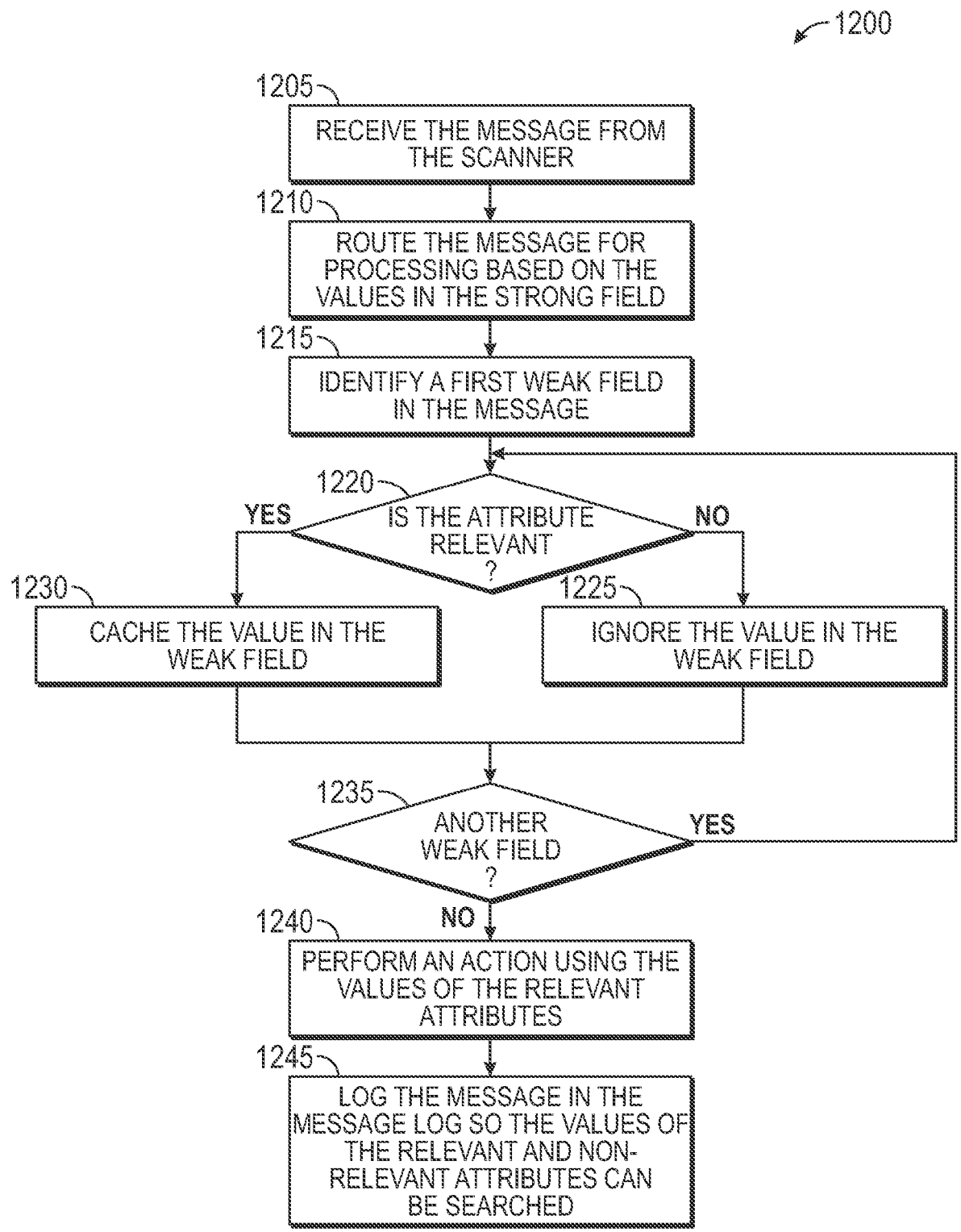
FIG. 12 is a flowchart for parsing a message that includes strong fields and weak fields, according to various embodiments.

FIG. 12 is a flowchart of a method 1200 for parsing a message that includes strong fields and weak fields, according to various embodiments. Although the method 1200 is described according to the perspective of the machine controller in the inventory tracking system, the method 1200 may be performed by any controller, whether a controller located on a machine (e.g., the scanner or the item-sortation machine) or a remotely located controller (e.g., the machine controller in the inventory tracking system).

At block 1205, the controller receives the message from the scanner, and at block 1210, routes the message for processing based on the values in the strong fields. In one embodiment, the controller in the inventory tracking system may include different sockets, threads, or applications for processing the messages. For example, the controller may include different sockets for different machines—e.g., a first socket/thread/application for processing messages received from the scanner and a second socket/thread/application for processing messages received from the item-sortation machine. The controller may also use a different socket, thread, or application depending on the type of the message. If the message reports out a scan event that occurred on the scanner, the controller may process the message. However, if the message is a log command, the controller may forward the data to a query manager for storing the message in the message log.

In another embodiment, the information for processing the message is obtained from a weak field. For example, a strong field may indicate the type of machine but may not indicate the purpose of the message or what action should be taken in response to the message. Instead, a weak field may include an attribute such as "MESSAGE TYPE" and a corresponding value indicate the message type and what action should be taken by the receiving controller.

At block 1215, the message parser identifies a first weak field in the message, and at block 1220, determines whether the attribute in the weak field is relevant to the controller. That is, the message can include attributes in weak fields that are not used or are unnecessary for the controller to perform an action corresponding to the message. For example, if the message reports a scan event, the controller may correlate the package to the obfuscated ID provided in one of the weak fields. As such, the weak field that contains the obfuscated ID is relevant to the controller. In contrast, the message may include other weak fields that include attributes that are not needed when correlating the package to the obfuscated ID such as physical dimensions of the package, status of the sensors in the scanner, metrics regarding the captured imaged, and the like.

If the weak field contains an attribute used to perform an action corresponding to an event or command indicated in the message, the method 1200 proceeds to block 1230 where the controller caches the value of the attribute. That is, the controller may store in local memory the value of the attribute (e.g., the obfuscated ID) so it is readily available to perform the action corresponding to the message type. If the attribute is not relevant, the method 1200 proceeds to block 1225 where the controller ignores the value in the weak field. Even though the value is ignored, the controller may nonetheless store the values in a message log (along with the relevant attributes) so that a user application can query the message log to identify various trends or status information of the machine sending the messages. For example, when reporting out a scan event, the scanner may include in the message the number of cameras that did, and did not, capture an image that included the bar code with the routing information. Although this information may not be relevant to the controller, it may be relevant to a user application (or a user) that later queries the message log to evaluate the attributes.

At block 1235, the message parser determines if there is another weak field in the message. That is, the message parser may evaluate all the weak fields in the message until reaching an end character.

At block 1240, the controller performs an action using the values of the relevant attributes. The action can vary depending on the machine or the type of message. For example, if the event is an eject event where the scanner moves the package to the item-sortation machine, the action may be the controller generating a message that commands the item-sortation machine to sort the package into a bin corresponding to its routing information. In another example, if the event is a troubleshooting event, the action may be the controller generating a work ticket for a technician to fix a particular camera indicated in the message. In another example, if the event is a scan event or a new package event, the action may be the controller correlating the received obfuscated ID to the package in its database and transmitting an acknowledgement to the controller that transmitted the message.

At block 1245, the controller logs the message in the message log so the values of the relevant and non-relevant attributes can be searched. That is, the message log may be accessible to a user application to identify potential problems with the scanner or identify optimizations for the scanner.

A first embodiment described herein is an apparatus that comprises: a controller configured to identify an event, and a communication module configured to generate a message corresponding to the event, wherein the message is formatted using a predefined message template. The communication module is configured to generate the message according to the predefined message template by: generating a predefined start character indicating a start of the message, generating a predefined end character indicating an end of the message populating at least one strong field that includes a first value selected from a set list of predefined values, wherein a location of the at least one strong field in the message is predefined, populating a first weak field that includes a first attribute and a corresponding first value, wherein the first attribute and the corresponding first value are separated by a secondary delimiter within the first weak field, populating a second weak field that includes a second attribute and a corresponding second value, wherein the second attribute and the corresponding second value are separated by the secondary delimiter within the second weak field. Wherein a primary delimiter separates the at least one strong field from the first and second weak fields and the primary delimiter separates the first weak field from the second weak field, wherein locations of the first and second weak fields in the message are interchangeable. Wherein the communication module is configured to transmit the message to an external device A second embodiment includes the first embodiment and wherein the at least one strong field is strongly typed and the first and second weak fields are weakly typed.

A third embodiment includes the first embodiment and wherein the message comprises: a second strong field that includes a second value that is selected from a set list of predefined values different from the set list of predefined values used by the at least one strong field, wherein a location of the second strong field within the message is predefined, and wherein the location of the at least one strong field and the location of the second strong field are not interchangeable.

A fourth embodiment includes the first embodiment and wherein the message template requires that the location of the at least one strong field occurs earlier in the message than the locations of the first and second weak fields.

A fifth embodiment includes the first embodiment and wherein the message comprises: a third weak field that includes a third attribute and a corresponding third value, wherein the third attribute and the corresponding third value are separated by the secondary delimiter within the third weak field, wherein locations of the first, second, and third weak fields in the message are interchangeable, and wherein the first, second, and third attributes are different from each other.

A sixth embodiment includes the first embodiment and wherein the communication module is configured to transmit the message using at least one TCP/IP packet, wherein the message is disposed in a payload of the TCP/IP packet.

A seventh embodiment includes the sixth embodiment and wherein the message is transmitted using a plurality of TCP/IP packets wherein the message is divided into across multiple payloads such that the predefined start character is in a payload of a first packet of the plurality of TCP/IP packets and the predefined end character is in a payload of second packet of the plurality of TCP/IP packets.

An eighth embodiment described herein is a method comprising: detecting an event occurring in a machine, and generating a message corresponding to the event, wherein the message is formatting using a predefined message template. Wherein generating the message comprises: generating a predefined start character indicating a start of the message, generating a predefined end character indicating an end of the message, populating at least one strong field that includes a first value that is selected from a set list of predefined values, wherein a location of the at least one strong field in the message is predefined, and populating a first weak field that includes a first attribute and a corresponding first value, wherein the first attribute and the corresponding first value are separated by a first predefined delimiter within the first weak field, wherein a location of the first weak field in the message is flexible. Wherein a second predefined delimiter separates the at least one strong field from the first weak field. The method also comprises transmitting the message to an external device.

A ninth embodiment includes the eighth embodiment and wherein generating the message comprises populating a second strong field that includes a second value that is selected from a set list of predefined values different from the set list of predefined values used by the at least one strong field, wherein a location of the second strong field within the message is predefined. Wherein the location of the at least one strong field and the location of the second strong field are not interchangeable.

A tenth embodiment includes the eighth embodiment and wherein generating the message comprises: populating a second weak field that includes a second attribute and a corresponding second value and third value, wherein the second attribute and the corresponding second value are separated by the first predefined delimiter within the second weak field, and the corresponding second value and the corresponding third value are separated by the first predefined delimiter within the second weak field. Wherein the message template requires that the location of the at least one strong field occurs earlier in the message than locations of the first and second weak fields.

An eleventh embodiment includes the eighth embodiment and wherein transmitting the message to the external device comprises: transmitting the message using at least one TCP/IP packet, wherein the message is disposed in a payload of the TCP/IP packet.

A twelfth embodiment includes the eleventh and wherein the message is transmitted using a plurality of TCP/IP packets wherein the message is divided into across multiple payloads such that the predefined start character is in a payload of a first packet of the plurality of TCP/IP packets and the predefined end character is in a payload of second packet of the plurality of TCP/IP packets.

A thirteenth embodiment includes the eighth embodiment and wherein the event corresponds to a package being processed by the machine, the method further comprising: assigning an ID to the package, wherein the corresponding first value is the assigned ID of the package and the first attribute indicates that the corresponding first value is the ID of the package.

A fourteenth embodiment includes the eighth embodiment and wherein generating the message comprises: populating a second weak field that includes a second attribute and a corresponding second value, wherein the second attribute and the corresponding second value are separated by the first predefined delimiter within the second weak field, wherein locations of the first and second weak fields in the message are interchangeable.

A fifteenth embodiment includes the fourteenth embodiment and wherein the method comprises: receiving the message at the external device, routing the message for processing based on the first value in the at least one strong field, determining that the first attribute in the first weak field is relevant for performing an action corresponding to the message, determining that the second attribute in the second weak field is unnecessary for performing the action, and performing the action using the first value for the first attribute.

A sixteenth embodiment includes the fifteenth embodiment and wherein the method comprises: logging the first value of first attribute and the second value of the second attribute in a message log, and receiving a query to search the message log to retrieve attribute values for a plurality of previously stored messages which includes the message.

A seventeenth embodiment described herein is a system comprising: a controller configured to identify an event occurring in a first machine, and a communication module configured to generate a message corresponding to the event, wherein the message is formatting using a predefined message template. the communication module is configured to: generate a predefined start character indicating a start of the message, generate a predefined end character indicating an end of the message, populate at least one strong field that includes a first value that is selected from a set list of predefined values, wherein a location of the at least one strong field in the message is predefined, and populate a first weak field that includes a first attribute and a corresponding first value, wherein the first attribute and the corresponding first value are separated by a first predefined delimiter within the first weak field, wherein a location of the first weak field in the message is flexible, wherein a second predefined delimiter separates the at least one strong field from the first weak field, and transmit the message to an external device.

An eighteenth embodiment includes the seventeenth embodiment and wherein communication module is configured to: populate a second strong field that includes a second value that is selected from a set list of predefined values different from the set list of predefined values used by the at least one strong field, wherein a location of the second strong field within the message is predefined, wherein the location of the at least one strong field and the location of the second strong field are not interchangeable.

A nineteenth embodiment includes the seventeenth embodiment and wherein communication module is configured to: populate a second weak field that includes a second attribute and a corresponding second value and third value, wherein the second attribute and the corresponding second value are separated by the first predefined delimiter within the second weak field, and the corresponding second value and the corresponding third value are separated by the first predefined delimiter within the second weak field, wherein locations of the first and second weak fields in the message are interchangeable.

A twentieth embodiment includes the nineteenth embodiment and wherein the external device is configured to: receive the message at the external device, route the message for processing based on the first value in the at least one strong field, determine that the first attribute in the first weak field is relevant for performing an action corresponding to the message, determine that the second attribute in the second weak field is unnecessary for performing the action, and perform the action using the first value for the first attribute.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a scanner configured to:
      identify routing information derived from an image captured of a package, and
      assign an obfuscated ID to the package, wherein the obfuscated ID is independent of the routing information and the image;

a machine controller configured to receive the obfuscated ID and the routing information from the scanner and generate a command for sorting the package based on the routing information; and an item-sortation machine configured to:
receive the obfuscated ID from the scanner;
receive the command from the machine controller, the command comprising an identifier;
correlate the obfuscated ID to the package based on when the package was received at the item-sortation machine, wherein correlating the obfuscated ID to the package is performed before the item-sortation machine performs the command;
determine that the obfuscated ID matches the identifier in the command; and
in response to determining that the obfuscated ID matches the identifier, sort the package into one of a plurality of bins according to the command.

2. The system of claim 1, wherein the machine controller is separate from the item-sortation machine.

3. The system of claim 2, further comprising:
an inventory tracking system configured to track packages in a building, wherein the machine controller is part of the inventory tracking system.

4. The system of claim 1, wherein the scanner comprises a camera configured to capture the image of the package, wherein the image comprises a shipping address and at least one bar code, wherein the routing information is derived from the bar code.

5. The system of claim 4, wherein the scanner is configured to process the image in firmware and protect personal information on the package.

6. The system of claim 5, wherein the personal information is protected by deleting the image once the image is processed in the firmware.

7. The system of claim 1, wherein the scanner is configured to process the image to identify a physical attribute of the package, wherein the scanner is configured to transmit the physical attribute of the package to the machine controller using the obfuscated ID.

8. The system of claim 7, wherein the machine controller is configured to store the physical attribute in a message log along with physical attributes from a plurality of messages corresponding to a plurality of packages that were scanned previously by the scanner.

9. The system of claim 8, further comprising:
a user application configured to query the message log to evaluate the physical attributes of the plurality of packages to identify trending data corresponding to at least one of the scanner and the plurality of packages.

10. A method comprising:
identifying, by a scanner, routing information derived from an image captured of a package;
assigning, by the scanner, an obfuscated ID to the package, wherein the obfuscated ID is independent of the routing information and the image;
transmitting the obfuscated ID to a machine controller and an item-sortation machine;
generating a command at the machine controller for the item-sortation machine based on the routing information, the command comprising an identifier;
transmitting the command to the item-sortation machine;
receiving, by the item-sortation machine, the obfuscated ID from the scanner;
correlating the obfuscated ID to the package based on when the package was received at the item-sortation machine;
determining that the obfuscated ID matches the identifier in the command; and
in response to determining that the obfuscated ID matches the identifier, sorting the package into one of a plurality of bins.

11. The method of claim 10, wherein the machine controller is part of an inventory tracking system that is separate from the item-sortation machine, wherein the inventory tracking system is configured to track packages in a building.

12. The method of claim 10, wherein identify the routing information comprises:
processing the image in firmware, wherein the image contains sensitive information; and
protecting the sensitive information contained within the image by deleting the image once the image is processed in the firmware.

13. The method of claim 10, further comprising:
processing the image to identify a physical attribute of the package; and
transmitting the physical attribute of the package to the machine controller using the obfuscated ID.

14. The method of claim 13, further comprising:
storing the physical attribute in a message log along with physical attributes from a plurality of messages corresponding to a plurality of packages that were scanned previously; and
querying the message log to evaluate the physical attributes of the plurality of packages to identify trending data corresponding to at least one of a scanner that captured the image and the plurality of packages.

* * * * *